United States Patent Office 3,119,783
Patented Jan. 28, 1964

3,119,783
POLYPROPYLENE STABILIZED WITH A MIXTURE OF A PARA-TERTIARYALKYLPHENOL-FORM-ALDEHYDE RESIN AND AN ORGANIC PHOSPHITE
Bernard O. Baum, Plainfield, N.J., assignor to Union Carbide Corporation, a corporation of New York
No Drawing. Filed Oct. 30, 1959, Ser. No. 849,745
6 Claims. (Cl. 260—43)

This invention relates to improved propylene polymer compositions. More particularly, it relates to polypropylene having greatly increased resistance to light and thermal degradation and being substantially lighter in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their high stiffness moduli.

Unfortunately, propylene polymers are subject to severe deterioration from the oxidative action of air at elevated temperatures. For example, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some anti-oxidants, for example, 4,4'-thiobis(6-tertiarybutyl-3-methylphenol), 2,2-bis(4-hydroxyphenyl)-propane, diphenylamine, etc., can be added to polypropylenes to prevent degradative effects during the short period the polymer is heated for melt spinning to produce fibers, it is not possible by the use of these conventional and well known anti-oxidants to prevent the oxidative degradation that occurs over prolonged exposure to air at temperatures below the melting temperature of polypropylene. For example, the inclusion in a polypropylene fiber of two percent by weight of 4,4'-thiobis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiary alkylphenolformaldehyde resins. The so stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide polypropylene compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiaryalkylphenol-formaldehyde resin, and an organic phosphite.

The low molecular weight para-tertiaryalkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiary-alkylphenols with formaldehyde in the presence of a suitable catalyst, such as oxalic acid, by procedures which are well known in the plastics art. Among the para-tertiary-alkylphenols which can be used in producing the suitable A-stage resins by reaction with formaldehyde are the para-tertiaryalkylphenols, in which the alkyl group contains from 4 to about 20 carbon atoms or more, preferably from 4 to about 10 carbon atoms, such as para-tertiary-butylphenol, para-tertiaryamylphenol, para-tertiaryheptyl-phenol, para-tertiarynonylphenol and the like.

Illustrative of the A-stage resins that can be used to control the oxidative degradation of polypropylene are para-tertiarybutylphenol-formaldehyde resin, para-tertiaryamylphenol-formaldehyde resin, para-tertiarynonyl-phenol-formaldehyde resin, para-tertiarydodecyl-phenol-formaldehyde resin and the like. The resins can be prepared from the pure para-phenol or from a mixture of para phenol with the ortho and/or meta isomers. However, the effectiveness of the A-stage resins as antioxidants is dependent in very large measure upon the para-tertiaryalkylphenol content in the resin. Thus, even though an A-stage resin formed from a mixture of isomeric alkylphenols having a major proportion of the para isomer is an effective constituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The organic phosphites suitable for use in the compositions of the present invention are those which correspond to the general formula:

wherein R, R' and R" represent hydrogen or monovalent hydrocarbon radicals which can be alkyl, cycloalkyl, aryl, aralkyl, alkaryl or alkenyl groups and the halogen and/or hydroxyl substituted hydrocarbon radicals of the same class, and wherein $x$ is a chalcogen having a molecular weight of less than 35, i.e., a sulfur or an oxygen atom.

In general those phosphites which contain at least one aryl, aralkyl, or alkaryl group are among the most effective compounds and are preferred.

Illustrative, but in no way limitative, of the general class of phosphites and thiophosphites which are suitably employed in the present invention are trioctyl phosphite, trimethallyl phosphite, triphenyl phosphite, tricresyl phosphite, nonyl bis(p-1,1,3,3-tetramethylbutylphenyl) phosphite, tricyclohexyl phosphite, tristearyl phosphite, 2-chloroethyl diphenyl phosphite, allyl di-phenyl phosphite, allyl phenyl hydrogen phosphite, dibutyl hydrogen phosphite, triosooctyl phosphorotrithioite, tributyl phosphorotrithioite, and the like. An even more comprehensive exemplification of the generic class of phosphites is set forth in the examples appearing hereinafter.

The organic phosphites are for the most part well-known in the art and are commercially available. They may also be prepared readily by any of several conventional methods. Perhaps the most common method of preparation consists in the reaction of a phosphorus trihalide with a phenol or alcohol corresponding to the R group of the phosphite desired to be produced. The thiophosphites can be prepared by employing a thiophenol or thioalcohol. Phosphites or thiophosphites containing mixed —R groups or mixed —XR groups are obtained by first forming the partial reaction product of a phosphorus trihalide with a phenol or an alcohol and thereafter further reacting the intermediate thus produced with other and different phenols, thioalcohols and the like.

Polypropylene compositions having improved heat and light stability and greatly improved color are, according to this invention, those which contain from about 0.05 percent by weight to about 5.0 percent by weight or greater of the A-stage para-tertiaryalkylphenol-formaldehyde resin hereinbefore described based on the weight of the polypropylene present, and in combination therewith an organic phosphite in an amount of from about 10 to about 600 percent by weight based on the weight of the phenolic resin stabilizer present.

Whereas the proportion of A-stage phenolic resin to propylene polymer and the proportion of phosphite decolorizer to A-stage phenolic resin as set forth above are satisfactory to produce a stable product having a light color suitable for all but the most unusual use requirements, it is to be understood that greater or lesser quantities of either the phenolic resin or the phosphite can be utilized and still be within the spirit and proper scope of the invention. In a practical sense, however, greater latitude can be exercised with respect to the phenolic resin stabilizer than with the phosphite constituent since ratios of phosphite to phenolic resin of greater than 6:1 on a weight basis do not to any large degree improve the color of the final composition.

The para-tertiaryalkylphenol-formaldehyde resin-organic phosphite stabilizer composition can be incorporated into the polypropylene by any suitable means, for example, by fluxing the polypropylene with the stabilizer composition on heated rolls, by the use of Banbury mixers, or of heated extruders, and the like, or by the use of a solvent solution of the stabilizer. Preferably, since some of the phosphites tend to hydrolyze readily the incorporation of the phosphite component into the composition should be carried out in the substantial absence of water.

The following examples will serve to further illustrate the present invention.

In Examples 1–49, the yellowness index of the compositions of the present invention are compared with control specimens of unadulterated polypropylene and polypropylene containing 1 percent by weight of an A-stage para-tertiarybutylphenol-formaldehyde resin. The polypropylene resin employed in the examples and for the control specimens was a propylene homopolymer having a melt index of about 2 decigrams per minute (ASTM D-1236-52T), a density of about 0.91 and a tensile modulus of about 150,000 p.s.i. The A-stage phenolic resin was an A-stage resin prepared by the oxalic acid catalyzed condensation of para-tertiarybutylphenol and formaldehyde under reflux conditions. The reaction product mass was then vacuum distilled to remove formed water, unreacted phenol, and low molecular weight condensation products, and thereafter cooled and ground.

The yellowness index reported is the quotient of the degree of yellowness divided by the degree of whiteness of the sample tested. Yellowness and whiteness are based on color reflectance measurements made on plaque samples by means of a spectophotometer modified for reflectance measurements (Beckman Model "B" abridged). The reflectance over vitrolite, an arbitrarily chosen reflectance standard, was measured on the plaque samples at wave lengths of 550 mµ and 430 mµ. Whiteness is based on the percentage reflectance at 550 mµ and yellowness is based on the percentage reflectance at 430 mµ. The yellowness index is therefore equal to $$\frac{R_{550\ m\mu} - R_{430\ m\mu}}{R_{550\ m\mu}}$$

in which R is the percentage reflectance at the wave length indicated by the subscript. The smaller the quotient, the lighter the color of the composition.

The unadulterated polypropylene sample plaque was determined to have a yellowness index of 0.41. The sample consisting of this same polypropylene in combination with 1 percent by weight of the A-stage phenolic resin described above was determined to have a yellowness index of 0.78.

EXAMPLES 1–49

Compositions containing 98 percent by weight polypropylene, 1 percent by weight phenolic resin and 1 percent by weight of a particular organic phosphite were prepared as follows: Powdered (60–80 mesh) phenolic resin was homogeneously distributed throughout the 60–80 mesh polypropylene by hand stirring for approximately 15 minutes. The phosphite being tested for color improving qualities was distributed throughout the polypropylene-phenolic resin formulation in the same manner. Water-free resins and equipment were used. This mixture was then stirred for an additional 15 minutes. The hand-stirred formulations were then melt-blended on a sheet of polytetrafluoroethylene stretched over a stainless steel electric grill. The surface temperature of the polytetrafluoroethylene heating surface was approximately 220° C. A sample size was chosen (25 grams) so that approximately two minutes were required to melt the compound. Each sample was removed from the heating surface after having been reduced to the molten state for a period of one minute and was then formed into plaques for color measurement. The yellowness index for each composition is reported in Table I below.

Table I

| Example No. | Composition: 98% polypropylene, 1% phenolic resin, 1% organic phosphite shown below | Yellowness Index |
|---|---|---|
| 1 | Diphenyl decyl phosphite | 0.54 |
| 2 | 2-Chloroethyl diphenyl phosphite | 0.51 |
| 3 | Dibutyl phenyl phosphite | 0.46 |
| 4 | Triphenyl phosphite | 0.49 |
| 5 | Tricresyl phosphite | 0.52 |
| 6 | Diphenyl hydrogen phosphite | 0.42 |
| 7 | Phenyl didecyl phosphite | 0.54 |
| 8 | Dibutyl hydrogen phosphite | 0.62 |
| 9 | Trioctyl phosphite | 0.56 |
| 10 | Tris(2-ethylhexyl) phosphite | 0.55 |
| 11 | Tridecyl phosphite | 0.57 |
| 12 | Allyl phenyl hydrogen phosphite | 0.47 |
| 13 | Trilauryl phosphite | 0.62 |
| 14 | Mixed 2-ethylhexyl octyl phenyl phosphite | 0.62 |
| 15 | Bis(2-ethylhexyl) hydrogen phosphite | 0.63 |
| 16 | Triamyl phosphite | 0.65 |
| 17 | Phenyl methyl hydrogen phosphite | 0.60 |
| 18 | Trimethallyl phosphite | 0.54 |
| 19 | Tributyl phosphite | 0.52 |
| 20 | Triallyl phosphite | 0.55 |
| 21 | Diallyl hydrogen phosphite | 0.59 |
| 22 | Trimethyl phosphite | 0.61 |
| 23 | Triisooctyl phosphite | 0.51 |
| 24 | Dipropyl hydrogen phosphite | 0.62 |
| 25 | Diisopropyl hydrogen phosphite | 0.54 |
| 26 | Di(tridecyl) hydrogen phosphite | 0.66 |
| 27 | Di(dodecyl) hydrogen phosphite | 0.67 |
| 28 | Tris(2-chloroisopropyl) phosphite | 0.54 |
| 29 | Tri(octadecyl) phosphite | 0.62 |
| 30 | 2-Ethylhexyl diphenyl phosphite | 0.58 |
| 31 | Bis(2-ethylhexyl) phenyl phosphite | 0.50 |
| 32 | Bis(2-ethylhexyl) p-tolyl phosphite | 0.54 |
| 33 | 2-Ethylhexyl di(p-tolyl) phosphite | 0.54 |
| 34 | cis-9-Octadecenyl diphenyl phosphite | 0.53 |
| 35 | Phenyl bis(3,5,5-trimethylhexyl) phosphite | 0.57 |
| 36 | p-Tolyl bis(3,5,5-trimethylhexyl) phosphite | 0.42 |
| 37 | Di-p-tolyl 3,5,5-trimethylhexyl phosphite | 0.60 |
| 38 | Octyl bis(3,5,5-trimethylhexyl) phosphite | 0.50 |
| 39 | Diisodecyl phenyl phosphite | 0.54 |
| 40 | Diisodecyl p-tolyl phosphite | 0.58 |
| 41 | Nonyl bis(p-1,1,3,3-tetramethylbutylphenyl) phosphite | 0.40 |
| 42 | Decyl bis(p-1,1,3,3-tetramethylbutylphenyl) phosphite | 0.54 |
| 43 | Di(dodecyl) p-tolyl phosphite | 0.56 |
| 44 | p-Cumyl dioctyl phosphite | 0.53 |
| 45 | (p-tert-Butylphenyl) di(octadecyl) phosphite | 0.50 |
| 46 | Bis(p-tert-butylphenyl) octadecyl phosphite | 0.52 |
| 47 | Tris(nonylphenyl) phosphite | 0.57 |
| 48 | Tributyl phosphorotrithiolite | 0.46 |
| 49 | Triisooctyl phosphorotrithiolite | 0.43 |

EXAMPLE 50

The decolorizing action of two typical organic phosphites as a function of concentration was determined by varying the concentration of the phosphite in propylene-phenol resin compositions having various phenolic resin contents. The polypropylene employed had a melt index of about 2.5 decigrams/min. and a tensile modulus of about 135,000 p.s.i. The phenolic resin was identical with that employed in Examples 1–49. The compositions were blended and fused using the same procedure as in those examples. The results in terms of yellowness index are reported in Table II below.

Table II

| Conc. of Additives (wt. percent) | | | Yellowness Index |
|---|---|---|---|
| Phenolic Resin | Tridecyl Phosphite | Diphenyl Decyl Phosphite | |
| 0.0 | 0.0 | 0.0 | 0.31 |
| 0.5 | 0.0 | 0.0 | 0.57 |
| 1.0 | 0.0 | 0.0 | 0.65 |
| 2.0 | 0.0 | 0.0 | 0.78 |
| 0.0 | 0.5 | 0.0 | 0.46 |
| 0.0 | 2.0 | 0.0 | 0.47 |
| 0.0 | 3.0 | 0.0 | 0.46 |
| 0.5 | 0.05 | 0.0 | 0.54 |
| 0.5 | 0.1 | 0.0 | 0.52 |
| 0.5 | 0.5 | 0.0 | 0.47 |
| 0.5 | 2.0 | 0.0 | 0.44 |
| 0.5 | 3.0 | 0.0 | 0.40 |
| 2.0 | 0.5 | 0.0 | 0.59 |
| 2.0 | 2.0 | 0.0 | 0.47 |
| 2.0 | 3.0 | 0.0 | 0.50 |
| 0.0 | 0.0 | 0.5 | 0.40 |
| 0.0 | 0.0 | 2.0 | 0.32 |
| 0.0 | 0.0 | 3.0 | 0.35 |
| 0.5 | 0.0 | 0.1 | 0.54 |
| 0.5 | 0.0 | 0.5 | 0.47 |
| 0.5 | 0.0 | 2.0 | 0.40 |
| 0.5 | 0.0 | 3.0 | 0.34 |
| 2.0 | 0.0 | 0.5 | 0.69 |
| 2.0 | 0.0 | 2.0 | 0.45 |
| 2.0 | 0.0 | 3.0 | 0.47 |

EXAMPLE 51

A one pound sample of polypropylene, which had a melt index of 1.3 decigrams per minute (ASTM D–1236–52T), an ash of 0.06 percent by weight and a density of 0.9098 gram per cc., was fluxed on a two roll mill heated to a temperature of 190° C., and the fluxed material was milled for about 5 minutes. During this treatment 0.02 pound of para-tertiaryamylphenol-formaldehyde A-stage resin was compounded with the polypropylene. This A-stage resin was produced by heating a mixture of para-tertiaryamylphenol, formaldehyde and oxalic acid as catalyst under reflux until the condensation product was prepared. It was then vacuum distilled to remove formed water, unreacted phenol and volatile low molecular weight condensation products; cooled and ground. The stabilized polypropylene composition was cooled and chipped. Fibers were spun from the chips by conventional spinning techniques using a spinnerette containing 25 orifices, each 0.02 inch in diameter. The molten polymer was extruded at 275° C. at an orifice velocity of about 8 feet per minute, stretched about 50 fold while still in a molten condition and then cooled in a stream of gas. The unoriented fibers were then steam stretched from 300 to 400 percent, and collected on a yarn package. The stretched yarns were then rewound onto wire frames designed to prevent free relaxation, and placed in a 125° C. air circulating oven. The exposed yarns were examined and evaluated for changes in physical properties at regular intervals of time.

In similar manner fibers were prepared and tested using other antioxidants known to be useful in stabilizing polymeric compositions. The results are tabulated below; all samples contained 2 percent by weight antioxidant.

| Stabilizer | 125° C. Air Oven Exposure | |
|---|---|---|
| | Hours to 50% Strength Loss | Hours to Rupture |
| Para-tertiaryamylphenol-formaldehyde resin | 677 | No rupture at 740 hours. |
| 4,4'-Thiobis(6-tertiarybutyl-3-methylphenol) | 55 | Over 70. |
| Bisphenol A | 10 | 20. |
| Diphenylamine | 7 | 20. |
| 2-Benzimidazolothiol | 25 | 30. |
| Hydroquinone | 25 | 30. |
| Control (none) | 2 | 10. |

EXAMPLE 52

Using a conventional polypropylene resin as in Example 50, two formulations were prepared each containing 1 percent by weight of an organic phosphite of the present invention, and 1 percent of the para-tertiaryamyl-phenol-formaldehyde resin of Example 51. A control composition was also prepared consisting of the polypropylene resin and 1 percent by weight of the para-tertiaryamylphenol-formaldehyde resin. Each of the three compositions was prepared, formed into fibers, and subjected to the oxidation resistance test according to the procedure of Example 51. The results are set forth below in Table III.

*Table III*

| Sample Description | Oxidative Resistance Test at 125° C. (Failure, hrs. in oven) |
|---|---|
| polypropylene + 1 percent phenolic resin + 1 percent dibutyl phenyl phosphite | 350 |
| polypropylene + 1 percent phenolic resin + 1 percent bis (2-ethylhexyl) hydrogen phosphite | 650 |
| polypropylene + 1 percent phenolic resin | 300 |

EXAMPLE 53

A styrene-propylene copolymer having a melt index of about 0.03 and containing an interpolymerized styrene to propylene ratio of 18:82 was blended with 1 percent by weight of the para-tertiarybutylphenol-formaldehyde resin stabilizer of Examples 1–49. A portion of this blend was further blended with 2-ethylhexyl octyl phenyl phosphite in an amount such that the resulting composition contained 1 percent by weight of the phosphite decolorizer. Each of the two compositions were compression molded and yellowness index determinations were made. The yellowness index of the copolymer composition containing only the phenolic resin stabilizer was found to be 0.68. The yellowness index of the composition containing the phosphite decolorizer was 0.43.

The polypropylene compositions of the present invention find particular utility, because of their light color and resistance to oxidation degradation, as extruded or spun textile fibers and yarns. These compositions find additional utility in the form of films and sheets suitable for packaging, and in the form of a wide variety of extruded and molded articles.

The compositions can also include conventional additives such as colorants, lubricants, slip agents, plasticizers and the like, and can be admixed with other polymeric materials either compatible and incompatible with polypropylene.

What is claimed is:

1. A stabilized polypropylene composition comprising a normally solid polypropylene, a stabilizing amount of an A-stage para-tertiaryalkylphenol-formaldehyde resin in which the alkyl group of the para-tertiaryalkylphenol contains from 4 to 20 carbon atoms and a decolorizing amount of an organic phosphite having the general formula:

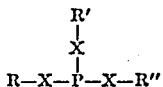

wherein R, R' and R" are each selected from the group consisting of hydrogen and a monovalent hydrocarbon radical, and wherein X is a chalcogen having a molecular weight of less than 35.

2. A stabilized polypropylene composition comprising a normally solid polypropylene, a stabilizing amount of an A-stage para-tertiaryalkylphenol-formaldehyde resin in which the alkyl group contains from 4 to 10 carbon atoms, and a decolorizing amount of an organic phosphite having the general formula:

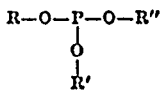

wherein R, R' and R" are each selected from the group consisting of hydrogen and a monovalent hydrocarbon radical.

3. The stabilized polypropylene composition of claim 2 wherein the A-stage para-tertiaryalkylphenol-formaldehyde resin is an A-stage para-tertiarybutylphenol-formaldehyde resin.

4. The stabilized polypropylene composition of claim 2 wherein the A-stage para-tertiaryalkylphenol-formaldehyde resin is present in an amount of from about 0.05 percent to about 5.0 percent by weight based on the weight of the polypropylene.

5. The stabilized polypropylene composition of claim 2 wherein the organic phosphite is present in an amount of from about 10 percent to about 600 percent by weight based on the weight of the A-stage para-tertiaryalkylphenol-formaldehyde resin.

6. The stabilized polypropylene composition of claim 5 wherein the organic phosphite is a compound having the general formula:

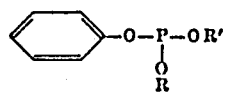

wherein R and R' are each selected from the group consisting of hydrogen and a monovalent hydrocarbon radical.

References Cited in the file of this patent

UNITED STATES PATENTS

| | | |
|---|---|---|
| 2,456,231 | Wiley | Dec. 14, 1948 |
| 2,572,571 | Marling | Oct. 23, 1951 |
| 2,816,876 | Higashi | Dec. 17, 1957 |
| 2,889,306 | Hawkins et al. | June 2, 1959 |
| 2,951,055 | Luttinger | Aug. 30, 1960 |
| 2,968,641 | Roberts et al. | Jan. 17, 1961 |
| 2,968,670 | Boyer et al. | Jan. 17, 1961 |
| 3,013,003 | Maragliano et al. | Dec. 12, 1961 |

FOREIGN PATENTS

| | | |
|---|---|---|
| 852,453 | France | Oct. 30, 1939 |